(12) United States Patent
Whitaker (10) Patent No.: US 9,718,156 B2
(45) Date of Patent: Aug. 1, 2017

(54) INJECTOR SLEEVE REMOVAL TOOL

(71) Applicant: Tony Whitaker, Campbellsville, KY (US)

(72) Inventor: Tony Whitaker, Campbellsville, KY (US)

(73) Assignee: Whitaker Tools, Inc., Campbellsville, KY (US)

( * ) Notice: Subject to any disclaimer, the term of this patent is extended or adjusted under 35 U.S.C. 154(b) by 711 days.

(21) Appl. No.: 13/987,420

(22) Filed: Jul. 23, 2013

(65) Prior Publication Data

US 2014/0101909 A1 Apr. 17, 2014

Related U.S. Application Data

(63) Continuation-in-part of application No. 12/584,060, filed on Aug. 28, 2009, now Pat. No. 8,490,263.

(60) Provisional application No. 61/854,847, filed on May 2, 2013, provisional application No. 61/190,441, filed on Aug. 28, 2008.

(51) Int. Cl.
*B23P 19/04* (2006.01)
*B25B 27/02* (2006.01)
*B25B 27/06* (2006.01)

(52) U.S. Cl.
CPC ............ *B23P 19/04* (2013.01); *B25B 27/023* (2013.01); *B25B 27/062* (2013.01); *Y10T 29/53883* (2015.01)

(58) Field of Classification Search
USPC ............................ 29/264, 237, 266, 270, 278
See application file for complete search history.

(56) References Cited

U.S. PATENT DOCUMENTS

| | | | |
|---|---|---|---|
| 2,050,005 A | 8/1936 | Heegeman | |
| 2,424,681 A | 7/1947 | Eberhart | |
| 3,685,124 A | 8/1972 | Wuertz | |
| 4,204,784 A * | 5/1980 | Eckendorff | ............ B23C 3/056 408/111 |
| 4,967,468 A | 11/1990 | Vossbrinck et al. | |
| 5,075,948 A | 12/1991 | Maier | |
| 5,090,102 A | 2/1992 | Lovell | |
| 5,664,328 A | 9/1997 | Fink et al. | |
| 5,784,783 A | 7/1998 | Carpenter | |

(Continued)

FOREIGN PATENT DOCUMENTS

DE 4201034 7/1993

*Primary Examiner* — Joseph J Hail
*Assistant Examiner* — Shantese McDonald
(74) *Attorney, Agent, or Firm* — Carrithers Law Office, PLLC (57) ABSTRACT

A tool for removing an injector sleeve from the cylinder head of a diesel engine between the rocker arms while the head remains mounted to the engine block within the vehicle. The devices includes a tap having a longitudinal body and a threaded cutting head at one end. A drive member comprises a bolt having a head at one distal end. An extraction nut is threaded onto the threaded shaft of the drive member followed by a bearing surface member such as a spacer. A hollow cylinder or support sleeve having an internal diameter greater than the injector sleeve to be removed and an external diameter less than the diameter of the sleeve bore includes a shoulder member.

15 Claims, 11 Drawing Sheets

(56) References Cited

U.S. PATENT DOCUMENTS

| | | | | |
|---|---|---|---|---|
| 6,637,089 B1 * | 10/2003 | English | ................ | B25B 27/023 29/237 |
| 6,990,713 B2 | 1/2006 | Tally et al. | | |
| 7,475,465 B1 * | 1/2009 | Weiss | .................... | B25B 27/023 28/255 |
| 2003/0041431 A1 | 3/2003 | Heflin | | |
| 2003/0188410 A1 | 10/2003 | English | | |
| 2007/0145321 A1 | 6/2007 | Lowery | | |

* cited by examiner

INJECTOR SLEEVE REMOVAL TOOL

RELATED APPLICATIONS

This application claims priority from U.S. Provisional Patent application Ser. No. 61/190,441 filed on Aug. 28, 2008, Provisional Patent Application Ser. No. 61/854,847 filed on May 2, 2013 and U.S. Pat. No. 8,490,263 which issued on Jul. 23, 2013 from Ser. No. 12/584,060 filed on Aug. 28, 2009 all of which are incorporated by reference herein in their entirety.

BACKGROUND OF THE INVENTION

Technical Field

The present invention relates to the field tools used to install and remove a typically brass or bronze injector sleeve from a cylinder head in a diesel engine. These sleeves are press fit into a bore in the head. After years of use the sleeves will loosen or begin to leak and need to be replaced.

Description of the Related Art

Tools for the removal of injector sleeves have been described and patented in recent years. U.S. Pat. No. 5,784,783 by Carpenter for METHOD OF REMOVING AN INJECTOR SLEEVE issued on Jul. 28, 1998 claims a tool wherein one inserts rounded head into the sleeve. A cylinder with a reverse tapered edge is forced down onto the top edge of the sleeve. This flairs the top edge inward, thus capturing the rounded head within the sleeve. The rounded head is pulled up and the intent is that the flair will hold tight to the rounded head and the sleeve will be pulled out with the tool. This design has some inherent flaws. First, the flaring process forces the sleeve into the head even tighter than it would initially be. Second, if the sleeve is tight, as one would expect, the flair is likely to weaken and pull apart, whereupon, the rounded head comes out but the sleeve has been seated even tighter.

U.S. Pat. No. 5,090,102 by Lovell for DIESEL INJECTOR SLEEVE REMOVER issued on Feb. 25, 1992 claims a hollow, externally threaded tube which has been slit down one side. A rod is inserted in the tube which is conical at the bottom end. The rod sticks out of the slitted threaded end of the tube and the large end of the rod is a little larger than the threaded tube. The top end of the rod is connected to a slide hammer. The threaded sleeve is inserted into the sleeve. One tap of the hammer seats the threads of the tube into the bore of the sleeve because tapping the hammer down against the top of the sleeve forces the sleeve down onto the conical end of the rod and this causes the threaded tube to expand, thus forcing the threads to grab into the bore of the sleeve. Now the slide hammer is pulled up to drive the assembly out along with the sleeve. The primary weakness of this design presents itself in the case where the sleeve is very tightly held within the cylinder head. The threads won't have a strong enough hold and will simply chew and pull material out of the sleeve but leave the sleeve in place in the head.

SUMMARY OF THE INVENTION

The present invention provides for a tool for removing an injector sleeve from the cylinder head of a diesel engine without the extra labor and cost of removing the entire head from the diesel engine.

An injector sleeve is used to seal each of the cavities in the top of a cylinder head or heads of a diesel. The sleeve maintains a clean environment within the cylinder head cavity by keeping external debris outside. The sleeve is generally made of brass or bronze and is sized to be pressed into the cavity. If the sleeve fails, leaks can occur and the sleeve must be replaced. This can require removal of the cylinder head, which is costly in terms of time and money. A huge savings is realized if the sleeve or sleeves can be removed without the removal of the cylinder head. The present invention is a tool which makes sleeve removal possible without removing the cylinder head.

An injector sleeve removal tool is disclosed herein and is used for removing an injector sleeve from the cylinder head of a diesel engine between the rocker arms while the head remains mounted to the engine block within the vehicle. The devices includes a tap having a longitudinal body having a threaded cutting head at one end and an axial threaded bore at the opposing end. A drive member comprises a bolt having a head at one distal end and a threaded shaft body portion. An extraction nut is threaded onto the threaded shaft of the drive member followed by a bearing surface member such as a spacer. A washer bearing surface member having an axial hole sized for movable engagement on the threaded shaft is disposed on the threaded shaft after the spacer. A hollow cylinder or support sleeve having an internal diameter greater than the injector sleeve to be removed and an external diameter less than the diameter of the sleeve bore includes a shoulder member projecting outwardly from the exterior of the support sleeve at a selected point. Moreover, a washer bearing surface member having a center hole is disposed onto the threaded end of a bolt having a holding nut threaded thereon spaced apart a selected distance from the threaded distal end. The threaded distal end of the bolt is inserted into and threadably engages threads of the tap nut so that the bolt is fastened to the tap. The end of the injector sleeve removal tool defining the tap assembly is passed through a hollow cylinder of a selected diameter sized so that the end edges of the tube rest on the surface of the cylinder head surrounding the injector sleeve to be removed. The washer bearing surface member is selected having an outer diameter large enough to provide a bottom surface for resting on the top edge of the hollow cylinder. The holding nut rests upon the top surface of the washer bearing surface member above the hollow cylinder. The head of the bolt opposite the tap assembly is rotated with a tool, whereby the distal end having the tap assembly turns to cut threads into the interior surface of the injector sleeve securing same. The head of the bolt is held in a stationary position and the holding nut is then turned and moved downwardly biasing the bottom surface of the washer bearing surface member against the top edges of the hollow cylinder pulling the injector sleeve upward and out of the cylinder head in order that a replacement injector sleeve can be pressed into place in the cylinder head.

The injector sleeve removal tool is described and can be fabricated by the following method. A thread cutting device commonly known as a tap is modified by attaching a threaded nut to the non-threaded end. This allows a bolt to be threaded into the nut and therefore fastened to the tap. A loose nut and a flat washer bearing surface member are put onto the bolt (in that order) before threading the bolt into the nut which was welded onto the end of the tap. This assembly is passed through a hollow cylinder sized to sit on the edge of the cylinder head just surrounding the injector sleeve to be removed. The flat washer bearing surface member is large enough so that the washer won't pass through but rests on the top edge of the hollow cylinder. The bolt (with the tap) is now used to cut 2 or three turns of threads into the injector sleeve. The nut is tightened to gently and evenly withdraw the bolt assembly and the injector sleeve from the engine.

Alternative embodiments may have the bolt welded directly to the tap, or even simultaneously cast as one piece or any other stable method of attachment. Also, the flat washer bearing surface member and cylinder may be welded together or otherwise attached or fabricated together as one would make a can or pan.

Experience has shown that two or three turns of thread into the sleeve are sufficient to pull the sleeve. One superior aspect of this design is that one can turn in more threads if required. Also, the pulling method is the even, central and straight thrust provided when the loose nut is tightened against the flat washer bearing surface member. This is believed to be more stable and powerful than that of tools that use the uneven strikes of a slide hammer.

A major feature of the sleeve removal tool is that the sleeves are removed without having to remove the engine from the vehicle, saving time, labor, expense, and increasing safety.

Other objects, features, and advantages of the invention will be apparent with the following detailed description taken in conjunction with the accompanying drawings showing a preferred embodiment of the invention and appended claims.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with the present invention, a tool is disclosed herein used for removing an injector sleeve from the cylinder head of a diesel engine without the extra labor and cost of removing the entire head from the diesel engine.

Figure 1:
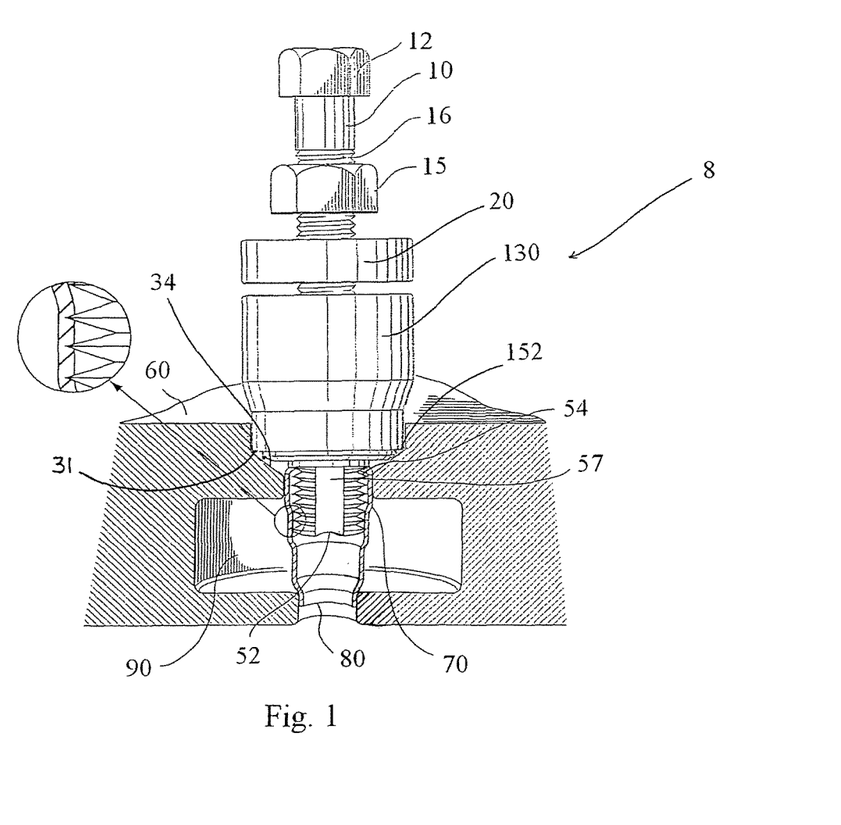
FIG. 1 is an oblique view of the injector sleeve removal tool assembly inserted into an injector sleeve which disposed into the cylinder head wherein the bottom end of the cylindrical body or sleeve abuts the conical portion of the cylinder head above the sleeve to be removed and the lower portion of the sleeve provides a guide means for alignment.

FIGS. 1-16 show the assembled tool 8 for removing an injector sleeve along with a potion of a cylinder head and described as follows. An axially moveable threaded rotating extraction nut 15 is threaded onto a bolt 10 having a head 12 defining a holding means extending from a shaft having threads 16 at least along the distal end opposite the head 12. In the embodiment of FIG. 1, about one and one half inches of the threads 16 of bolt 10 extend through rotating non-ratcheting.

A tap 51 has a shaft 61 an axial threaded bore for threadably engaging or fixedly attaching to a drive member such as the distal threaded end of a bolt or shaft 10 and may be immovably attached thereto by a set screw, welding of the like. The opposing distal end 52 of the tap 51 comprises a generally cylindrical threaded cutting head end portion 54 including threads which extend coaxially in a horizontal plane rather than an inclined plane such as typical of a screw. Moreover, the threads extend circumferentially around the end portion 54 in a discontinuous manner forming a plurality of smooth parabolic axial grooves 57 disposed between axial threaded sections 58. In at least one preferred embodiment, the six grooves are disposed between six threaded sections defining a cross sectional hexagon shape. Of course it is contemplated that the threads could be arranged in an inclined plane to bite into the inner wall of the sleeve 80.

A washer, collar, ring or other load bearing surface member 20, is disposed between the rotating nut 15 and a hollow sleeve or cylinder 130 which has an inner cylindrical diameter for tap 51 to rotatably and slidably move therein. The length of sleeve/cylinder 130 is of sufficient length to receive the tap 51 and the available threads left on the bolt 10 after the tool 8 is assembled with the rotating extraction nut 15, washer bearing surface member or collar 20 and upper portion of the tap 51. Enough threads 57 on the extraction head 54 must be exposed to reach into and cut at least three threads into the interior side wall of an injector sleeve 80. The washer bearing surface member 20 can be of a selected thickness but must include a center hole (not shown) large enough to allow axial movement along the bolt 10. The diameter of the washer bearing surface member 20 must be at least large enough to engage the top end edge of the cylinder 60 or if the sleeve is disposed between the washer 20 and axial head, the washer 20 rests upon the sleeve 130.

As shown in FIG. 1, one preferred embodiment of the hollow cylinder or sleeve 130 includes an upper body 131 of a larger diameter than the lower body portion 152 which includes a tapered or chaffered portion 154 therebetween. The internal diameter or bore of upper body portion 131 and lower body portion are the same sized to slidably received the cylindrical alignment means defining a coaxial bushing 132. As illustrated in FIG. 1, the cylinder 130 rests in the cylinder head 60 and more particularly within a conical depression or seat 34 formed around the injector bore of the cylinder head 60.

Figure 2:
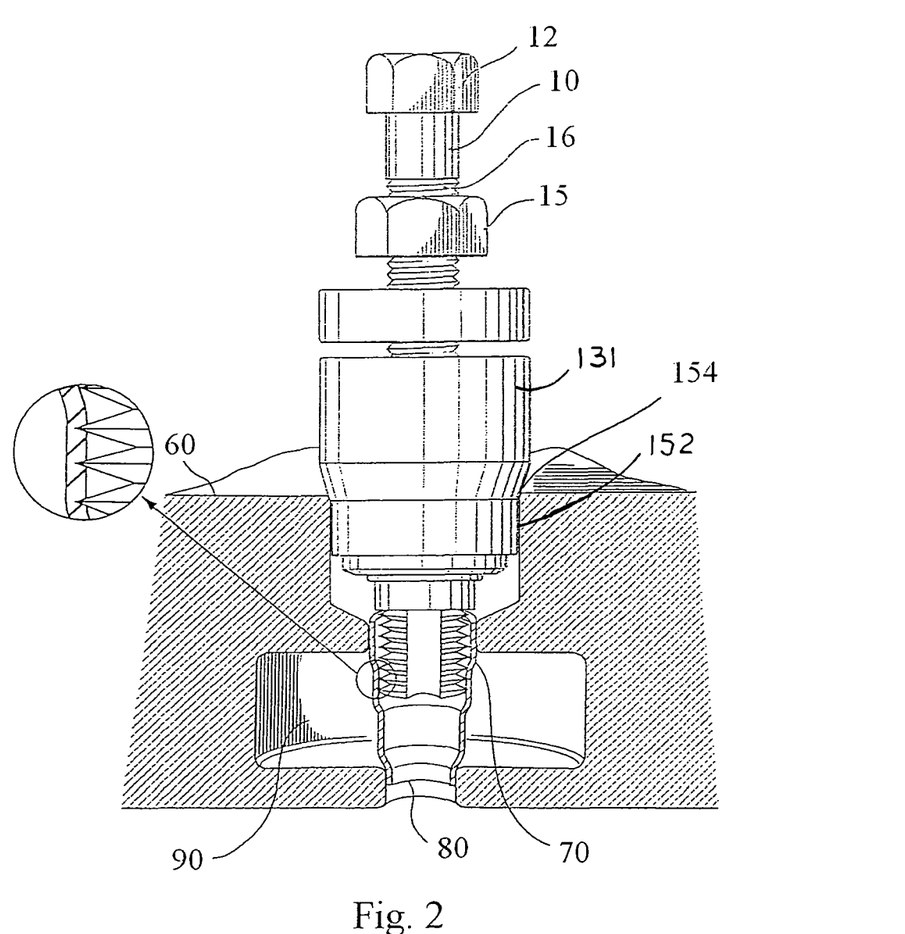
FIG. 2 is a perspective view of an embodiment of the present invention showing a stop means formed within the tool cylinder whereby a chaffered circumferential ring contacts the cylinder head of the engine limiting penetration of the tool cylinder therein and the lower portion of the sleeve can provide a guide means.
Figure 3:
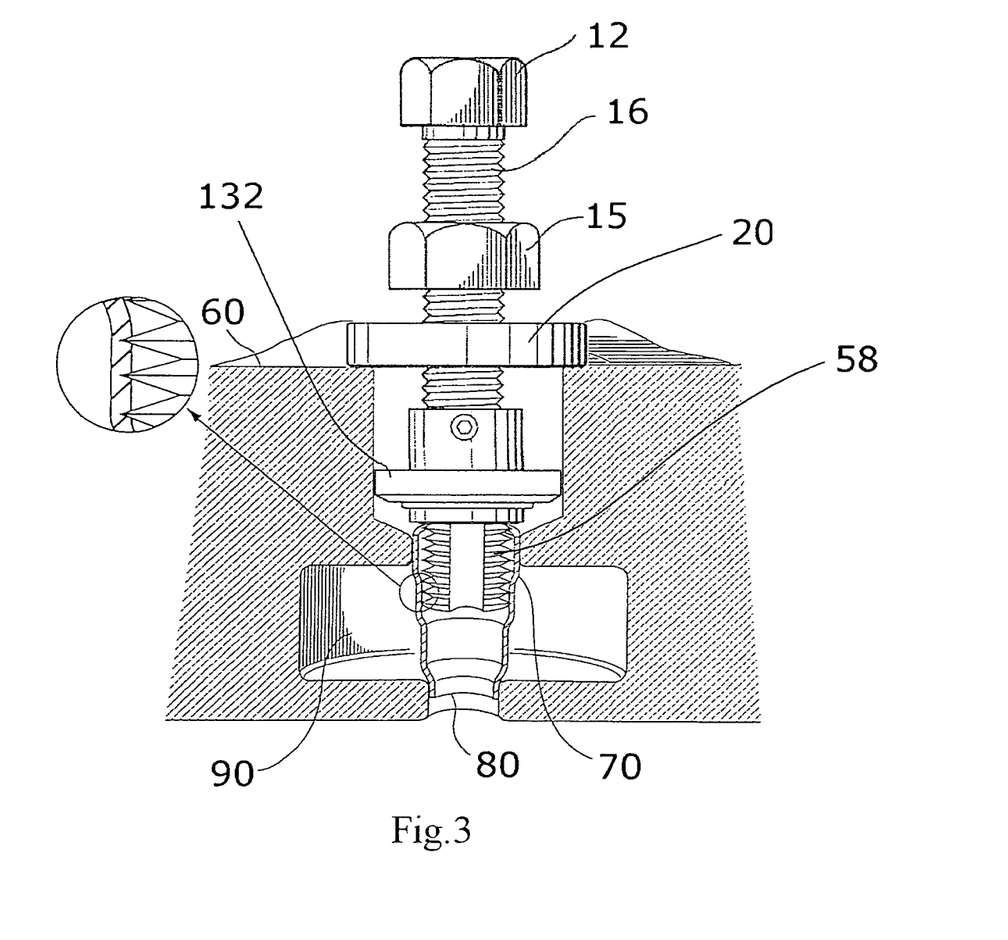
FIG. 3 is a perspective view of the injector sleeve removal tool shown in FIGS. 2 showing use of the removal tool without the hollow sleeve wherein the collar or ring provides a stop means comprising a ring, washer, or collar resting on the engine head disposed below the nut and above spacer means for extracting the sleeve with a coaxial bushing disposed within the cavity acting as a guide means above the threaded member engaging the internal walls of the injector cup to be removed therefrom.
Figure 4:
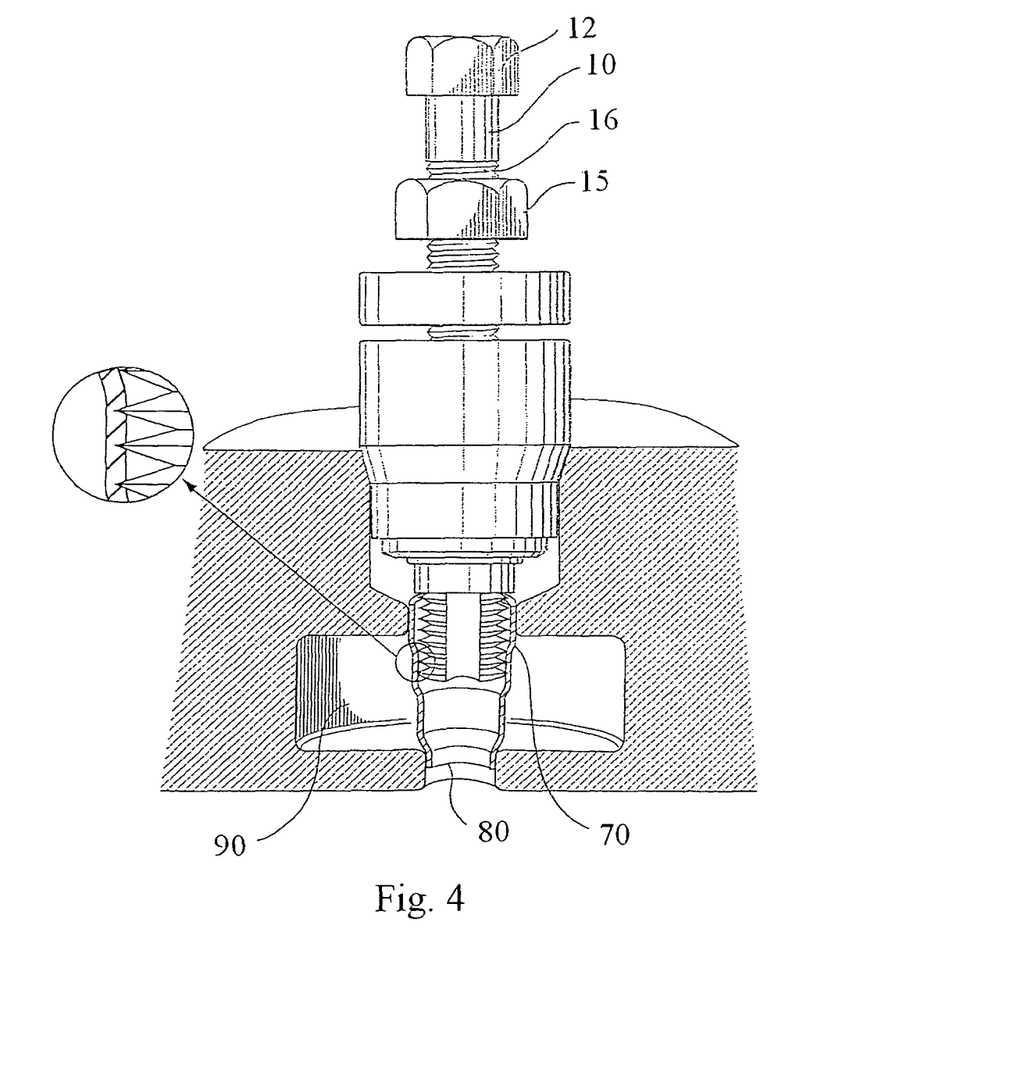
FIG. 4 is still another embodiment of the injector sleeve removal tool wherein the tapered portion of the hollow sleeve serves to abut the cylinder head.
Figure 5:
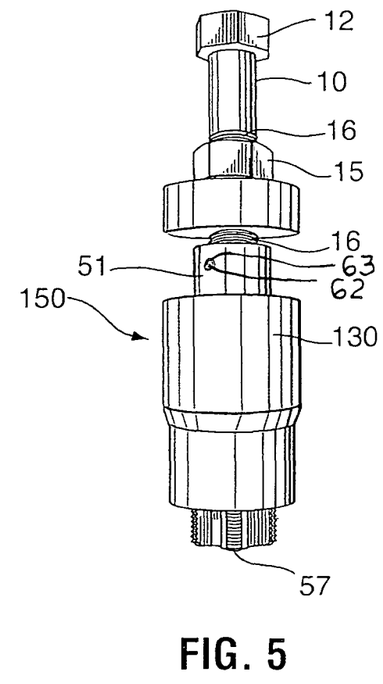
FIG. 5 is a perspective view showing an embodiment of the sleeve removal tool assembly showing the attachment of the threaded extraction head slidably received within the hollow sleeve and showing attachment of the top portion of the extraction head threadably receiving the threads of the bolt with the sliding collar or ring mounted thereon below a nut.
Figure 6:
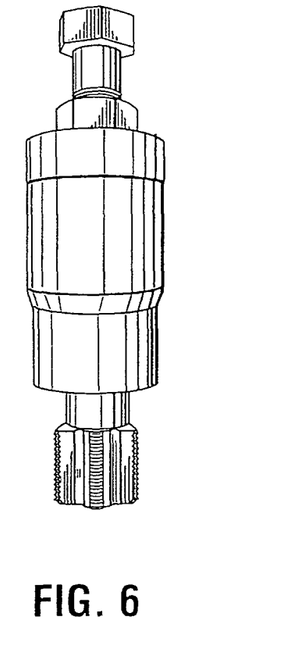
FIG. 6 is a perspective view showing an embodiment of the sleeve removal tool assembly wherein the sleeve is slidably received over the top portion of the extraction head abutting the collar and revealing the bottom portion of the extraction head and the nut abuts the collar which abuts the sleeve.
Figure 7:
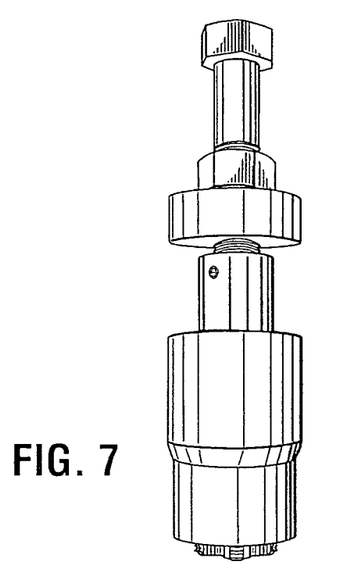
FIG. 7 is a perspective view showing the sleeve extending over the extraction head wherein the nut abuts the collar and the sleeve slides over the extraction head.
Figure 8:
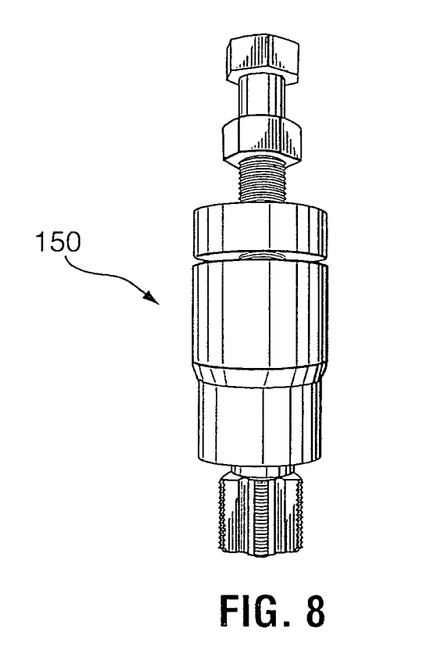
FIG. 8 is a perspective view showing the nut spaced apart from the collar which is spaced apart from the sleeve.
Figure 9:
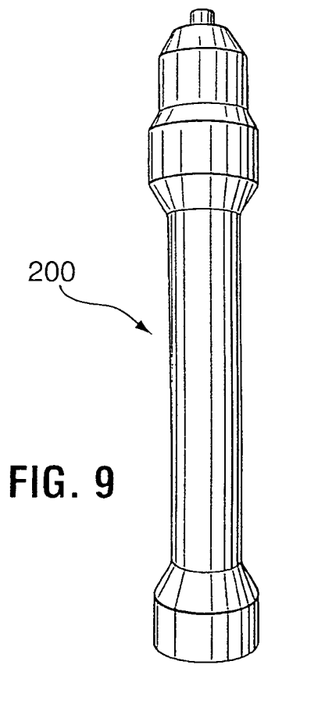
FIG. 9 is a perspective view of one type of simple injector insertion tool.

As shown in FIG. 2-4, an annular or circumferential taper stop means 154 is formed by the sleeve/cylinder 131 whereby the taper 154 or the end of the sleeve contacts the cylinder head 60 of the engine limiting penetration of the cylinder 131 therein.

FIGS. 5-8 and 10-12 show an alternate embodiment of the assembled tool 150 for removing an injector sleeve described as follows. An axially moveable threaded drive member including external holding means comprises a rotating extraction nut 15 is threaded onto a bolt 10 having a head 12 defining a holding means extending from a shaft 14 having threads 16 at least along the distal end thereof opposite the head 12. In the embodiment of FIG. 1, about one and one half inches of the threads 16 of bolt 10 extend through rotating extraction nut 15.

A tap 150 threadably engages threads 16 of the bolt 10 and is immovably held in a selected position by a set screw 62 threadably engaging a threaded hole 63 formed in the non-threaded upper portion 155 of the tap 150. The set screw provides a removable an adjustable means for threadably engaging the bolt 10. Of course, as described heretofore and shown in FIGS. 1-4, a stationary nut 40 could be used as an alternate means for adjustably and removably attaching the tap 150 to the bolt 10 wherein the stationary nut 40 or other means could be attached by welding or casting onto a non-threaded distal end (not shown) of the tap 150. The opposing distal threaded end 52 of the tap 150 comprises a generally cylindrical threaded cutting head end portion 54 including threads 56 which extend coaxially in a horizontal plane rather than an inclined plane such as typical of a screw. Moreover, the threads 56 extend circumferentially around the end portion 54 in a discontinuous manner forming a plurality of smooth parabolic axial grooves 57 disposed between axial threaded sections 58. In at least one preferred embodiment, the six grooves are disposed between six threaded sections defining a cross sectional hexagon shape.

Figure 10:
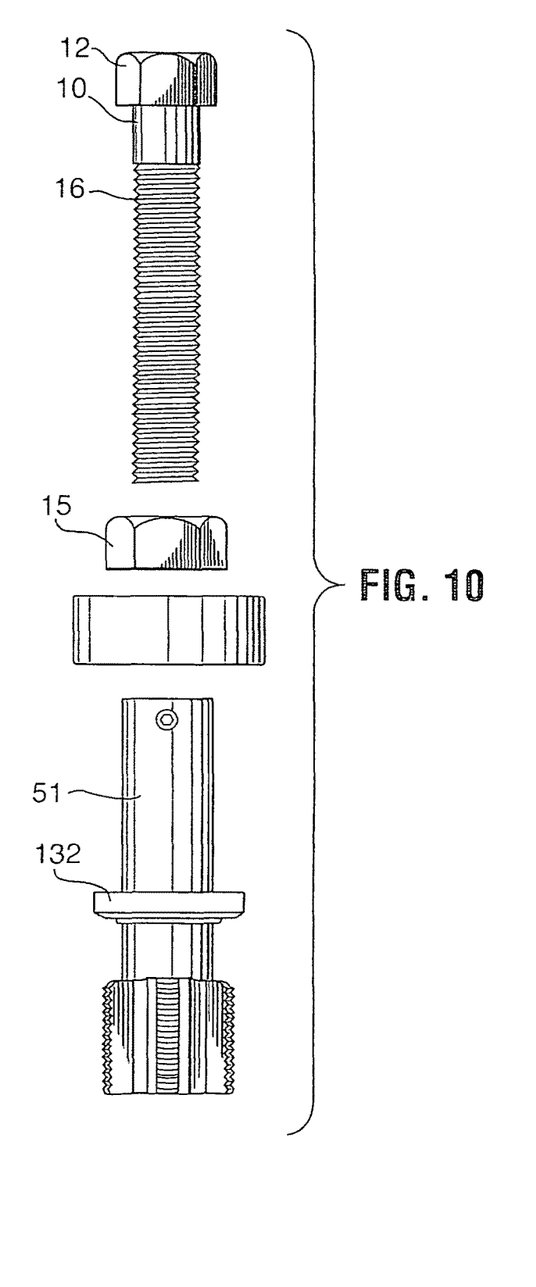
FIG. 10 is an exploded view of an injector sleeve removal tool showing the tap and threaded cutting head, the drive member or bolt for engaging the tap, the extraction nut, the bearing surface member or collar disposed below the extraction nut, and a cylindrical alignment member immovably affixed to the tap above the threaded extraction head.
Figure 11:
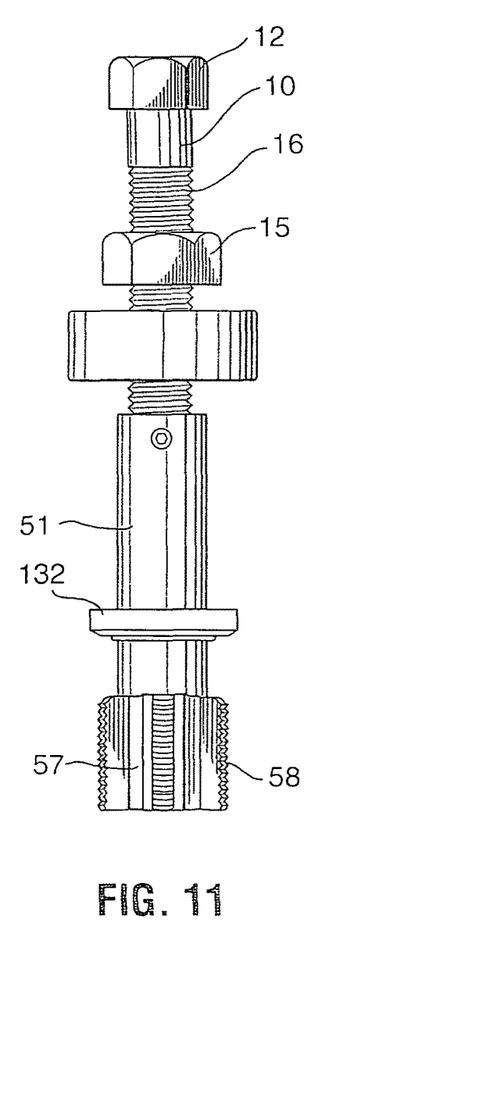
FIG. 11 is a perspective view of the assembled injector sleeve removal tool of FIG. 10.

A washer bearing surface member 120 as shown in FIGS. 5-8 and 10-12 is disposed between the rotating extraction nut 15 and a hollow sleeve or cylinder 130 which has a large enough inner diameter for the tap 150 to rotatably move therein and for the injector sleeve 80 to easily slide up and into. The length of cylinder 130 must be longer than the tap 150 and stationary holding means and the available threads left on the bolt after the tool 8 is assembled with the rotating extraction nut 15, washer bearing surface member 120 and means for holding 155. Enough threads 57 must be exposed to reach into and cut at least three threads into the interior side wall of an injector sleeve 80. The washer bearing surface member 120 can be of a selected thickness but must include a center hole 121 large enough to allow axial movement along the bolt shaft 14. The diameter of the washer bearing surface member 120 must be at least large enough to engage the top end edge of the cylinder 131. As shown in FIG. 10, the washer bearing surface member 120 comprises a single thick washer which bears against the cylinder head 60 of the engine or as shown in FIG. 11 against the sleeve or cylinder 130 in order to remove the injector sleeve 80.

Figure 12:
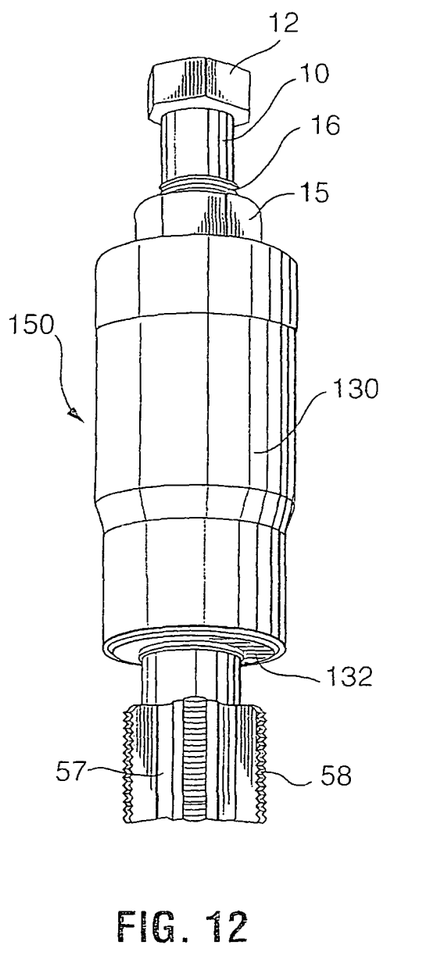
FIG. 12 is a perspective view of the injector sleeve of FIGS. 10 and 11 showing the alignment means slidably received within the sleeve.

FIG. 10 is an exploded view of an injector sleeve removal tool 149 showing the tap 150 having a longitudinal body, a threaded cutting head 54 at one end and an axial threaded bore 59 at the opposing end. The drive member 7 comprises a bolt having a head 12 at one distal end and a threaded shaft body portion 16 cooperatively engaging the axial threaded bore of the tap 40. An extraction nut 15 threadably engages the threaded shaft 16 of the drive member 7. A washer bearing member 120 sized for movable engagement on the threaded shaft 16 is disposed between the extraction nut 15 and cutting head 54. A cylindrical alignment means defining a coaxial bushing 132 is affixed to the tap 40 between the bearing surface member 120 and the cutting head 54. FIG. 11 shows the assembled injector sleeve removal tool assembly 149. FIG. 12 shows the assembly of FIG. 11 including a cylinder or sleeve 130 for engaging the bearing member 120 and providing means for positioning and/or aligning and/or limiting penetration of the tap 40 and cutting head 54 in the cylinder head 60.

Method of Use of Injector Sleeve Removal Tool

To use the tool, cylinder 130 or the collar 20 is supported by the cylinder head or is limited in penetration within the cylinder head 60 so that the extraction head is placed into the injector cavity against the cylinder head 60 and the cylinder 130 straddles the injector sleeve 80. Now the bolt-tap-washer assembly is passed through the cylinder 130 and is urged and turned clockwise into the upper portion of the inner sleeve wall 70 of the sleeve 80 cutting threads into the inner wall of the sleeve 80. After at least one turn and preferably at two or three turns, threads are cut into the inner sleeve wall 70 sleeve, one holds the bolt head with one wrench while turning the extraction nut 15 clockwise with another wrench until the sleeve is withdrawn from the cylinder head and is loose. The area surrounding the injector sleeve 80 comprises a hollow portion 90 of the cylinder.

More particularly, the tool shown in FIGS. 1-16 is used for removing an injector sleeve 80 from the cylinder head 60 of a diesel engine while the head remains mounted to the engine block. A thread cutting device defining a tap 51, is modified by attaching a threaded tap nut 15 to the threaded distal end. A washer bearing surface member 20, having a center hole is disposed onto the threaded end of a bolt having a holding nut threaded thereon spaced apart a selected distance from the threaded distal end. The threaded distal end of the bolt is inserted into and threadably engages threads of the tap 51, so that the bolt is fastened to the tap.

As shown in FIG. 1, the end 31 of the cylinder 130 rests on the cylinder head 60 and more particularly within a conical depression or seat 34 formed around the injector bore 36 of the cylinder head 60 which serves as an alignment, positioning, and support means of the cutting head and tap for pulling the injector sleeve 80.

As shown in FIG. 2, a circumferential ring or taper 154 formed around the cylinder 130 rests on the surface of the cylinder head 60 and supports the end 31 of the cylinder 131 within a conical depression above the surface of the seat 34 formed around the injector bore 36 of the cylinder head 60 wherein the cylinder 131 provides means of aligning, positioning, and supporting the cutting head 54 of the tap 51.

As shown in FIG. 3, a portion of the taper 154 extending from around the cylinder 131 rests on the surface of the cylinder head and supports the end 31 of the cylinder 131 within a conical depression above the surface of the seat 34 formed around the injector bore 36 of the cylinder head 60 wherein the cylinder 131 provides means of aligning, positioning, and supporting the cutting head 54 of the tap 51.

As shown in FIG. 4, the edges of the cylinder 131 rests on the surface of the cylinder head 60 and supports the cylinder 131 within a conical depression above the surface of the seat formed around the injector bore of the cylinder head 60 wherein the cylinder 131 provides means of aligning, positioning, and supporting the cutting head 54 of the tap 51.

Figure 15:
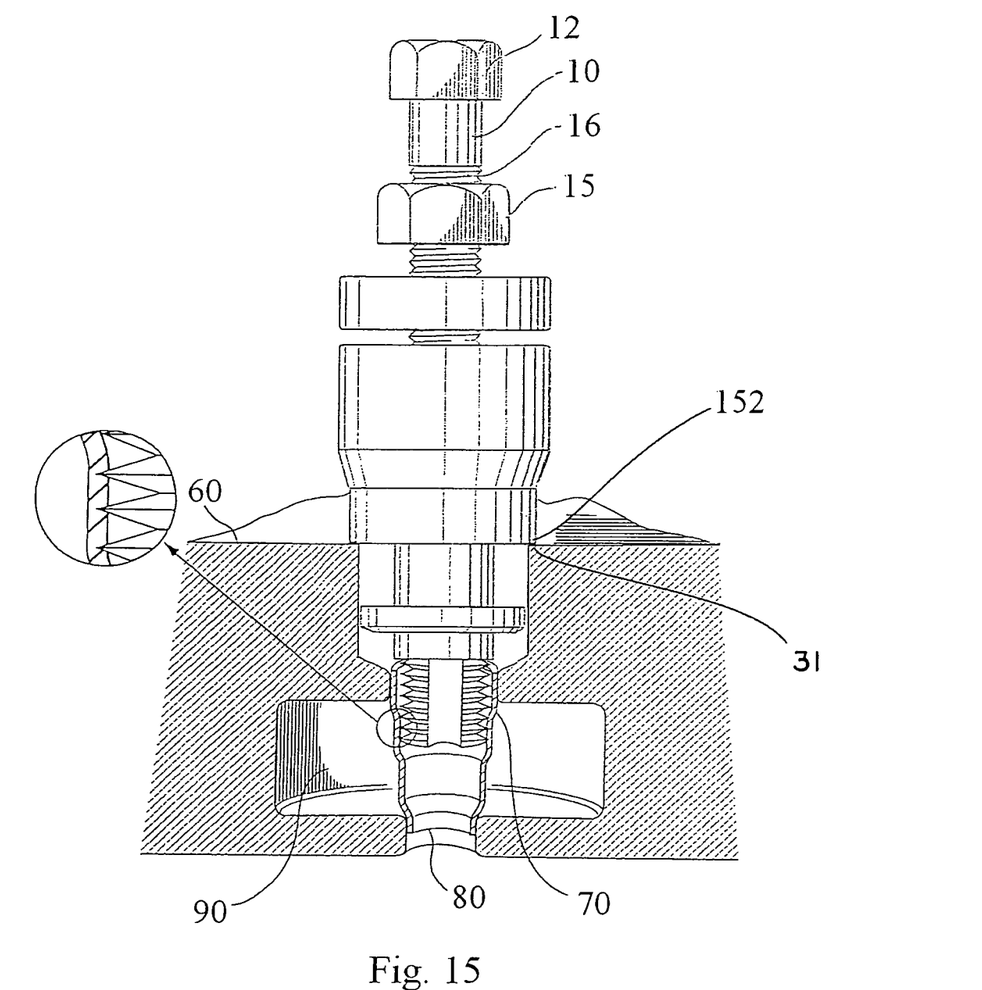
FIG. 15 is a perspective cutaway view of the sleeve removal tool being used showing the coaxial bearing alignment means disposed within the cylinder head bore, the threads of the extraction head engaging the sidewalls of the injector sleeve and the bottom edge portion of the sleeve abutting the top of the engine head to support extraction of the injector sleeve.
Figure 16:
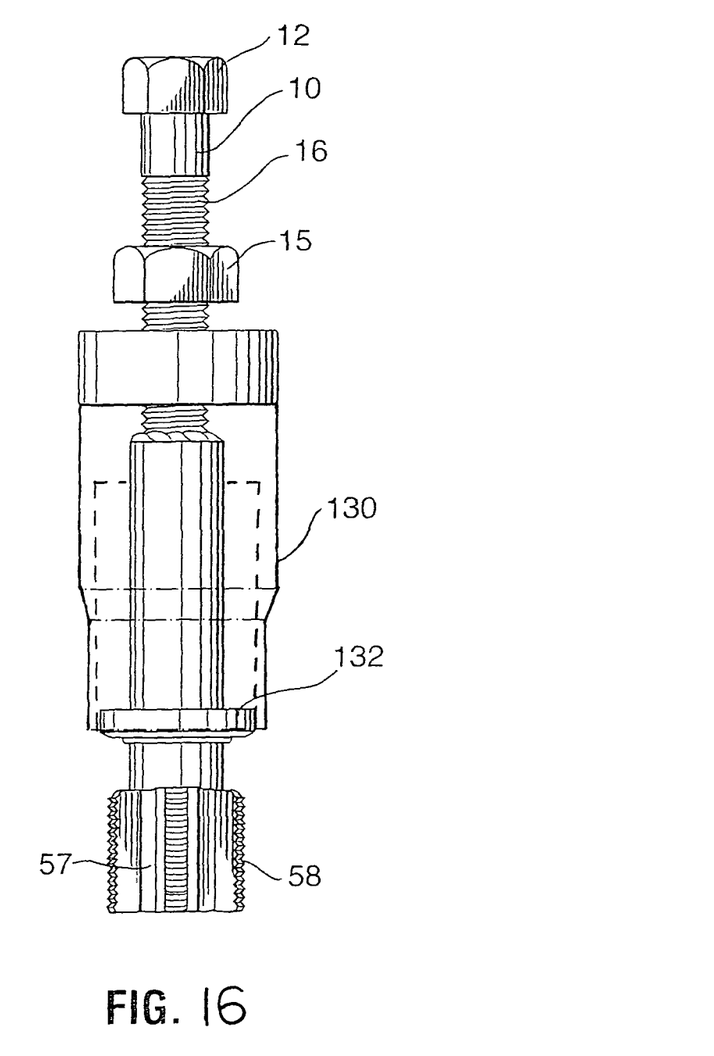
FIG. 16 is a perspective cutaway side view of the injector sleeve removal tool showing the inner cylindrical sidewalls of the sleeve sized for receiving the coaxial bearing alignment member affixed to the shaft of the extraction head wherein the top portion of the cavity forms a coaxial ring or lip limiting downward movement of the sleeve when the tool is picked up by the drive means.

As shown in FIG. 15, the end 31 of the cylinder 130 can rest on the surface of the cylinder head 60 or within a conical depression or seat 34 formed around the injector bore 36 of the cylinder head 60 and serve as an alignment, positioning, and support means for the cutting head and tap for pulling the injector sleeve 80. Furthermore, the cylinder 131 is formed having a bottom portion 152 having a smaller diameter than a top portion 131 with the intersection forming a circumferential lip 154 which may rest upon the cylinder head 60 and be used to provide a support means to pull the injector sleeve 80.

Figure 13:
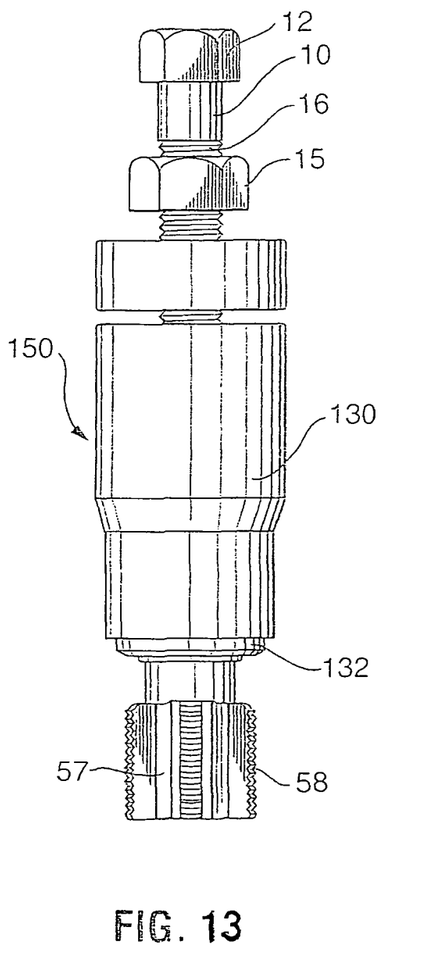
FIG. 13 is another perspective view of the injector sleeve of FIGS. 10 and 11 showing the alignment means partially extending beneath the sleeve and the sleeve spaced apart from the collar or ring which is spaced apart from the extraction nut.
Figure 14:
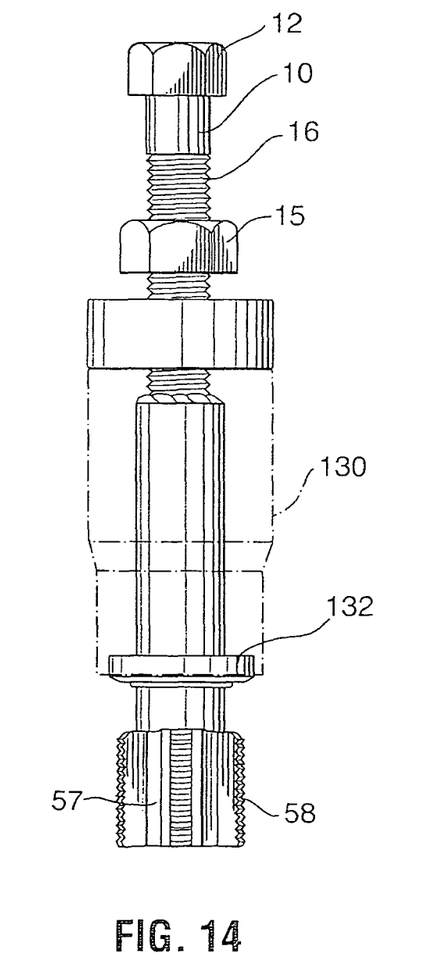
FIG. 14 is another perspective view of the injector sleeve of FIGS. 10 and 11 showing the sleeve or positioning cylinder drawn in phantom lines with the upper portion or tap of the extraction head slidably received therein and the alignment means or coaxial bearing member affixed to the shaft of the extraction head also slidably received therein and the collar slidably received on the threads of the drive means or bolt.

The injector sleeve removal tool shown in FIGS. 11-13, shows the bearing surface member 120 providing a support means which can rest upon the cylinder head 60 and a tap 51 including a coaxial bushing 132 for alignment disposed between the cutting head 54 and the bearing surface member 120.

The end of the injector sleeve removal tool defining the tap assembly is passed through a hollow cylinder 130 of a selected diameter. The washer bearing surface member 120 is selected having an outer diameter large enough to provide a bottom surface for resting on the top edge of the hollow cylinder 130. The extraction nut 15 rests upon the top surface of the washer bearing surface member above the hollow cylinder 130. The drive member 7 head 12 of the bolt opposite the tap 51, 150 assembly is rotated with a tool, whereby the distal end having the tap assembly turns to cut threads into the interior surface of the injector sleeve 80 securing same. The drive member 7 head of the bolt is held in a stationary position and the holding extraction nut 15 is then turned and moved downwardly biasing the bottom surface of the washer bearing surface member 120 against the top edges of the hollow cylinder 130 pulling the injector sleeve 80 upward and out of the cylinder head 60 in order that a replacement injector sleeve can be pressed into place in the cylinder head.

The sequential steps are as follows:
1. Remove the valve cover. (est. 30 minutes)
2. Disconnect the fuel injector electrical connector.
3. Remove the internal oil, drain plugs in the cylinder head.
4. Remove the outboard fuel injector retaining bold which holds the injector.
5. Remove the fuel injector with a little light pressure.
6. Place the injector sleeve remover (THE WRENCH) in the injector bore.
7. Manually turn the injector tool (WRENCH) CLOCKWISE 5-6 turns (until the tap is tight into the injector sleeve.
8. Tighten shoulder bolt on the wrench CLOCKWISE downward until the sleeve is removed.
9. Then put the wrench into a vice and turn the wrench COUNTERCLOCKWISE until the sleeve is released from the wrench.
10. Put the new sleeve into the injector bore.
11. Insert the Driver Tool into the new sleeve that is residing in the injector bore then tap the DRIVER TOOL with a normal hammer until the sleeve fits tightly into injector bore.
12. Reconnect the outboard fuel injector retaining bold which holds the injector.
13. Reconnect the internal oil rail, drain plugs in the cylinder head.
14. Reconnect the fuel injector electrical connector.
15. Restore the Valve cover. One side is finished.

The Injector Sleeve Kit

The injector sleeve kit includes the sleeve removal tool 8 and the sleeve installation tool 230.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. An injector sleeve removal tool comprising:
   a tap having a longitudinal body comprising a threaded cutting head at a distal end thereof;
   said tap having a proximate end connecting to a distal end of a drive member;
   said drive member comprising a bolt having a head and a shaft, and said shaft including a threaded shaft body portion;
   an extraction nut threadably engaging said threaded shaft body portion of said drive member;
   a bearing surface member having an axial hole therein disposed on said shaft of said bolt between said extraction nut and said proximate end of said tap;
   cylindrical alignment means defining a coaxial bushing affixed to said tap between said bearing surface member and said threaded cutting head of said tap; and
   a cylindrical support member having an axial hole therein coaxially disposed on said shaft of said bolt between said bearing surface and said cylinder head for positioning and/or aligning and/or limiting penetration said cutting head within said cylinder head.

2. The injector sleeve removal tool of claim 1, wherein said cutting head threads extend coaxially therearound in a horizontal plane.

3. The injector sleeve removal tool of claim 1, said cutting head threads extending circumferentially there around in a discontinuous manner forming a plurality of spaced apart smooth parabolic axial grooves between a plurality of axial threaded sections.

4. The injector sleeve removal tool of claim 3, wherein said sleeve extends coaxially over said cylindrical alignment means.

5. The injector sleeve removal tool of claim 4, wherein said cylindrical support member includes a top end having an axial throughhole therein coaxially engaging said shaft of said bolt and said cylindrical support member includes a cylindrical hollow body sized for receiving said cylindrical alignment means therein.

6. The injector sleeve removal tool of claim 1, wherein said a cylindrical support member includes an upper body portion having a larger external diameter than a lower body portion forming an annular taper stop means for resting on a portion of said cylinder head of the engine limiting penetration of said cutting head within said sleeve.

7. The injector sleeve removal tool of claim 1, wherein said bearing surface member comprises a washer of a selected thickness.

8. The injector sleeve removal tool of claim 1, wherein said cylindrical member comprises a sleeve having a closed top end with an axial hole therethrough for coaxially engaging said shaft of said bolt.

9. An injector sleeve removal tool comprising:
a tap having a longitudinal body including a threaded cutting head at a distal end thereof;
said tap extending from a bolt including a head and a shaft portion including a plurality of threads disposed above said longitudinal body of said tap;
an extraction nut threadably engaging said plurality of threads of said shaft portion of said bolt;
a bearing surface member comprising a washer having an axial hole therein disposed between said longitudinal body of said tap and said extraction nut;
a cylindrical member having an axial hole therethrough coaxially disposed on said shaft of said bolt having an inner diameter greater than an outer diameter of said cutting head of said tap and a length extending from said bearing surface member for limiting penetration of said cutting head into said sleeve.

10. An injector sleeve removal tool for removing an injector sleeve from a cylinder head of a diesel engine between the rocker arms while the head remains mounted to the engine block within the vehicle, comprising:

a tap having a longitudinal body and a threaded cutting head at one end and a proximate end attaching to a drive member;
said drive member comprising a bolt having a head at one distal end, a threaded shaft body portion and a distal end attaching to said proximate end of said longitudinal body of said tap;
an extraction nut threaded onto said threaded shaft of said drive member;
a bearing surface member having an axial hole therethrough sized for movable engagement on said threaded shaft disposed between said extraction nut and said cutting head;
and a cylindrical alignment means disposed between said bearing surface member and said axial cutting head.

11. An injector sleeve removal tool for removing an injector sleeve from the cylinder head of a diesel engine between the rocker arms while the head remains mounted to the engine block within the vehicle, comprising:
a tap having a longitudinal body and a threaded cutting head at a distal end;
a drive member comprising a bolt having a head at one distal end, a shaft including a threaded shaft body portion, and a distal end cooperatively engaging said proximate end of said longitudinal body of said tap;
an extraction nut threaded onto said threaded shaft body portion of said drive member;
a bearing surface member having an axial hole there through for coaxial movable engagement on said shaft disposed between said extraction nut and said longitudinal body of said tap;
and a cylindrical positioning means disposed between said bearing surface member and said axial cutting head.

12. The injector sleeve removal tool of claim 11, said cylindrical positioning means including abutment means for cooperatively engaging said cylinder head of said diesel engine.

13. The injector sleeve removal tool of claim 11, wherein said cutting head threads extend coaxially therearound in a horiozontal plane.

14. The injector sleeve removal tool of claim 11, said cutting head threads extending circumferentially there around in a discontinuous manner forming a plurality of spaced apart smooth parabolic axial grooves between a plurality of axial threaded sections.

15. The injector sleeve removal tool of claim 11, wherein said a cylindrical support member includes an upper body portion having a larger external diameter than a lower body portion forming an annular taper stop means for resting on a portion of said cylinder head of the engine limiting penetration of said cutting head within said sleeve.

* * * * *